United States Patent Office 2,726,945
Patented Dec. 13, 1955

2,726,945

β-(2-CHLOROANILINO)PROPIONITRILE

Samuel Allen Heininger, Dayton, Ohio, assignor to Monsanto Chemical Company, St. Louis, Mo., a corporation of Delaware No Drawing. Application April 19, 1954,
Serial No. 424,256

5 Claims. (Cl. 71—2.3)

The present invention relates to organic nitrogen compounds and more particularly provides the hitherto unknown β-(2-chloroanilino)propionitrile, a method of producing the same and pre-emergent herbicidal compositions containing said nitrile.

According to the invention β-(2-chloroanilino)propionitrile is prepared by contacting 2-chloroaniline with acrylonitrile at ordinary or increased temperatures and in the presence or absence of an acidic agent as catalyst. Advantageously reaction of the 2-chloroaniline with the acrylonitrile may be effected by simply mixing the two reactants and catalyst, in the presence or absence of an inert diluent or solvent, and heating the resulting mixture at a temperature of say from 40° C. to the refluxing temperature. The useful temperatures will depend upon the pressure at which the addition reaction is conducted. Thus when operating at ordinary atmospheric pressure, temperatures of from say 100° C. to 200° C., depending upon the presence or absence of a diluent, give good results; whereas when operating under superatmospheric pressure, a lower temperature range, say a temperature of from 50–150° C., is recommended. Since preparation of the β-(2-chloroanilino)propionitrile involves addition of 1 mole of the 2-chloroaniline to 1 mole of the acrylonitrile the reactants may be advantageously used in equimolar proportions; however, an excess of the acrylonitrile is generally useful in that it serves as a reaction diluent and at the same time makes for adequate availability of the acrylonitrile in the otherwise somewhat sluggish addition reaction.

While inert solvents or diluents may be employed in the reaction, use of the same is generally advantageous only when operating batchwise, under superatmospheric pressures with large quantities of reactants. Such solvents or diluents may be, e. g., ether, nitrobenzene, dioxane, etc. Acidic catalysts generally should be employed. As examples of useful catalysts may be mentioned: acid reacting metallic salts such as cuprous or cupric, stannous or stannic, ferrous or ferric acetates, sulphates or chlorides, organic or inorganic acids such as acetic, sulfuric, phosphoric or oxalic acid, etc. Since acrylonitrile is a readily polymerizable material it is generally advantageous to conduct the addition reaction in the presence of an inhibitor of polymerization e. g., hydroquinone, tert-butyl catechol, etc.

β-(2-chloroanilino)propionitrile is a stable, rather high boiling viscous liquid which may be used for a variety of industrial and agricultural purposes. It is particularly valuable as an extremely efficient pre-emergent herbicide. When applied to soil surfaces in very low concentrations it prevents germination and growth of both broad-leafed and narrow-leafed plants. This is surprising in that the isomeric β-(4-chloroanilino)propionitrile possesses no such effect and the β-(3-chloroanilino)propionitrile demonstrates pre-emergent action only to a very slight degree.

The present invention is further illustrated, but not limited, by the following examples:

*Example 1*

A mixture consisting of 254 g. (2.0 moles) of 2-chloroaniline, 265 g. (5.0 moles) of acrylonitrile, 18 ml. of glacial acetic acid, 1 g. of cuprous chloride and 4 g. of hydroquinone was heated for 12 hours at 150° C. in a stainless steel, rocking autoclave. Fractionation of the resulting reaction mixture gave 81.9 g. of the substantially pure β-(2-chloroanilino)propionitrile B. P. 123° C./0.5 mm., $n_D^{25}$ 1.5725.

*Example 2*

A mixture of 254 g. (2.0 moles) of 2-chloroaniline and 53 g. (1.0 mole) of acrylonitrile was heated to reflux and then 5 ml. of glacial acetic acid was added. The whole was refluxed for 1 hour. One ml. of acetic acid was added and refluxing (112–113° C.) was continued for a total of 88 hours, during which period glacial acetic acid was added in 5 ml. portions at 4 spaced intervals. The total amount of acetic acid used was 21 ml. Distillation of the resulting reaction mixture gave the substantially pure β-(2-chloroanilino)propionitrile B. P. 125–130° C./0.5 mm., $n_D^{25}$ 1.5725.

*Example 3*

A mixture consisting of 254 g. (2.0 moles) of 2-chloroaniline, 265 g. (5.0 moles) of acrylonitrile, 40 ml. of glacial acetic acid and 1 g. of hydroquinone was heated at 150° C. in a stainless steel bomb for 14 hours. Distillation of the resulting reaction mixture gave the substantially pure β-(2-chloroanilino)propionitrile B. P. 120–125° C./0.3 mm.

*Example 4*

To a mixture consisting of 2-chloroaniline (127.5 g., 1.0 mole) and 25 ml. of glacial acetic acid which had been heated to 145° C., acrylonitrile was added dropwise until the temperature of the reaction mixture had dropped to 130° C. The whole was then refluxed (120° C.) overnight. To the refluxing reaction mixture there was then added 1 g. of copper acetate and refluxing was continued for 3 hours at which point 3 ml. of concentrated sulfuric acid was added. Refluxing was continued for an additional 2 hours. The resulting reaction mixture was then poured into water, neutralized with sodium hydroxide and steam distilled. The viscous liquid residue obtained in the steam distillation was ether extracted. Distillation of the ether extract gave the substantially pure β-(2-chloroaniline)propionitrile B. P. 125–130° C./0.3 mm.

*Example 5*

A mixture consisting of 254 g. (2.0 mole) of 2-chloroaniline, 265 g. (5.0 moles) of acrylonitrile, 18 ml. of glacial acetic acid, 1 g. of cuprous chloride, 5 g. of sodium acetate and 5 g. of hydroquinone was heated, with rocking, in a stainless steel 1-liter bomb for 12 hours at a temperature of 150° C. Unreacted acrylonitrile and 2-chloroaniline were removed from the resulting reaction mixture, the first by stripping and the latter by vacuum distillation, and the viscous, liquid residue was cooled and diluted with ether. After filtering the diluted material to remove some polymer, the filtrate was distilled to give the substantially pure β-(2-chloroanilino)propionitrile B. P. 129–135° C./0.6 mm., $n_D^{25}$ 1.5726

The fractions of β-(2-chloroanilino)propionitrile obtained in Examples 1–4 were combined with that obtained in the present example and the combined material distilled to give the pure β-(2-chloroanilino)propionitrile B. P. 139–141° C./0.3 mm., $n_D^{25}$ 1.5734 and analyzing as follows:

|  | Found | Calcd. for $C_9H_9ClN_2$ |
|---|---|---|
| Percent C | 60.07 | 59.9 |
| Percent H | 4.90 | 5.03 |
| Percent N | 15.48 | 15.56 |
| Percent Cl | 19.43 | 19.63 |

*Example 6*

2-chloroaniline (510 g., 4.0 moles), 20 g. of acetic acid and 10 g. of cuprous chloride were placed in a flask and the mixture was heated to 150° C. There was then gradually added at a temperature of 140–150° C. during a time of 3.5 hours 212 g. (4.0 moles) of acrylonitrile containing 10 g. of hydroquinone. The whole was then heated at 150° C. for another 2 hours. Distillation of the resulting reaction product gave 406 g. of the substantially pure β-(2-chloroanilino)propionitrile B. P. 140–150° C./1.5–2.0 mm., $n_D^{25}$ 1.5715.

*Example 7*

The pre-emergent herbicidal effect of the redistilled β-(2-chloroanilino)propionitrile of Example 5, as well as of β-(3-chloroanilino)propionitrile and β-(4-chloroanilino)propionitrile, was determined by employing the following testing procedure.

Boxes having a 5″ x 5″ exposed area were partially filled with a layer of soil and 20 seeds were placed thereon and then covered with a ¼″ to ½″ layer of soil which had been screened to ¼″ sieve. Test boxes containing 20 seeds each of beet and rye grass, respectively, were prepared. The surface soil of the seeded boxes was then sprayed respectively with a 1.0 percent emulsion of one of the isomeric β-(chloroanilino)propionitriles. The emulsions were prepared by adding respective cyclohexanone solutions of the chloroanilino propionitriles to water containing an emulsifying agent, the quantity of solution employed being calculated to give emulsions containing 1.0 per cent of the propionitrile compound, based on the weight of the total emulsion. The quantity of emulsifying agent used was 0.2 per cent by weight based on the total weight of the emulsion. Said emulsifying agent comprised a mixture of polyalkylene glycol derivative and an alkylbenzene sulfonate.

The quantity of emulsion which was sprayed on the surface soil of the seeded boxes was calculated to correspond to 50 lbs. of the test compound per acre, 9.1 cc. of the 1.0 per cent emulsion being used. The sprayed boxes as well as similar seeded, but unsprayed, boxes were then maintained at standard conditions of temperature and watering for a period of 2 weeks. At the end of that time the number of healthy seedlings in each box was counted. Thus the number of non-emerging and damaged seedlings was obtained by difference. This difference is designated as "X." "Percent phytotoxicity" was determined by the ratio of "X" to the number of healthy seedlings in the controls. The following results were obtained:

| Compound Tested | Index* of Phytotoxicity to— | |
|---|---|---|
|  | Beet | Rye Grass |
| β-(2-chloroanilino)propionitrile | 3 | 3 |
| β-(4-chloroanilino)propionitrile | 0 | 0 |
| β-(3-chloroanilino)propionitrile | 1 | 1 |

*0=no effect; 1=very slight effect; 3=very little germination; the few that did germinate were stunted.

Emulsions of the β-(2-chloroanilino)propionitrile may be used to destroy already existing plant growth by direct application to the undesirable plants, e. g., by spraying; or the emulsions may be employed to prevent plant growth by application to media which normally supports plant growth. When employed to prevent plant growth, for example in parking areas, highway abutments, railway yards, the emulsions may be applied by spraying only the surface of said media or they may be admixed with said media. Generally spraying of only the soil surface is sufficient to prevent plant growth in areas which are to be kept clear of plants. However, the emulsions may be incorporated into customarily employed temporary surfacing materials, e. g., oils, cinders, etc. Instead of being used in emulsion form the β-(2-chloroanilino)propionitrile may be incorporated into solid carriers such as clay, talc, pumice and bentonite to give pre-emergent herbicidal compositions which may be applied to surfaces that are to be kept free of plant growth.

What I claim is:

1. β-(2-chloroanilino)propionitrile.
2. A herbicidal composition comprising an inert carrier and β-(2-chloroanilino)propionitrile as the essential active ingredient.
3. A pre-emergent herbicidal composition comprising an inert carrier and β-(2-chloroanilino)propionitrile as the essential active ingredient.
4. The method of destroying undesirable plants which comprises applying to said plants a toxic quantity of a herbicidal composition comprising β-(2-chloroanilino)propionitrile as the essential active ingredient.
5. The method of preventing plant growth which comprises applying to media normally supporting said growth a toxic quantity of a herbicidal composition comprising β-(2-chloroanilino)propionitrile as the essential active ingredient.

References Cited in the file of this patent

UNITED STATES PATENTS

| 1,992,615 | Hoffmann et al. | Feb. 26, 1935 |
| 2,396,513 | Jones | Mar. 12, 1946 |
| 2,449,991 | Gresham et al. | Sept. 28, 1948 |
| 2,472,347 | Sexton | June 7, 1949 |

OTHER REFERENCES

Bekhli: Chem. Abstracts, vol. 45, column 7540 (1951).

Beilstein's Handbuch der Organischen Chemie, 4th ed., vol. 12, page 601.